Dec. 28, 1954 J. N. GRAEF 2,697,890
METHOD OF AND APPARATUS FOR MOUNTING STEREO SLIDES
Filed Nov. 19, 1952 2 Sheets-Sheet 1
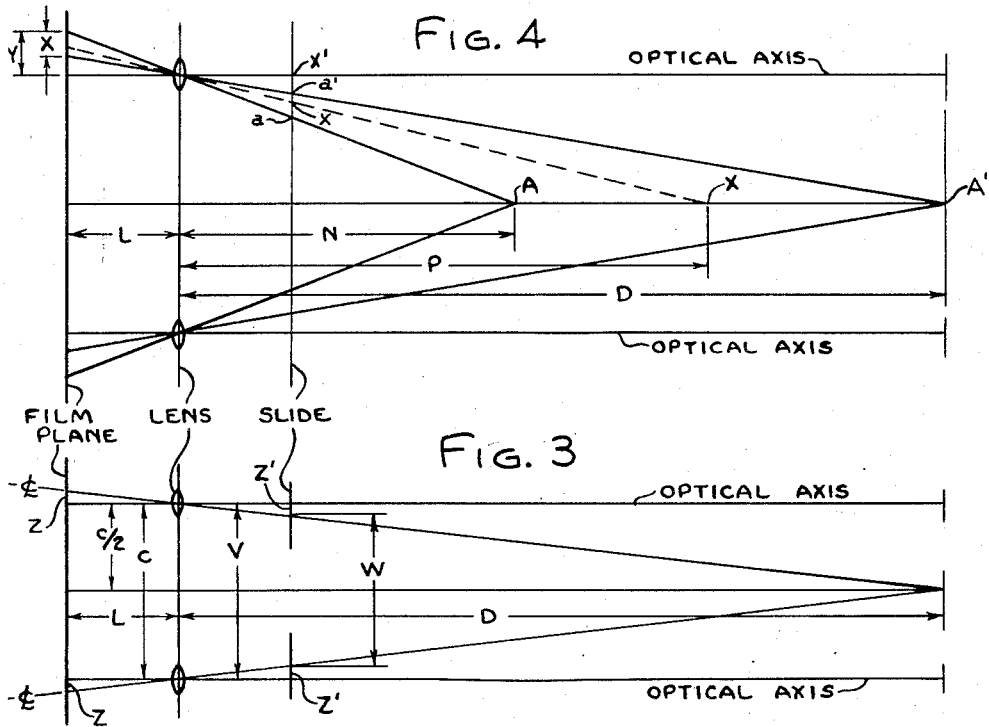
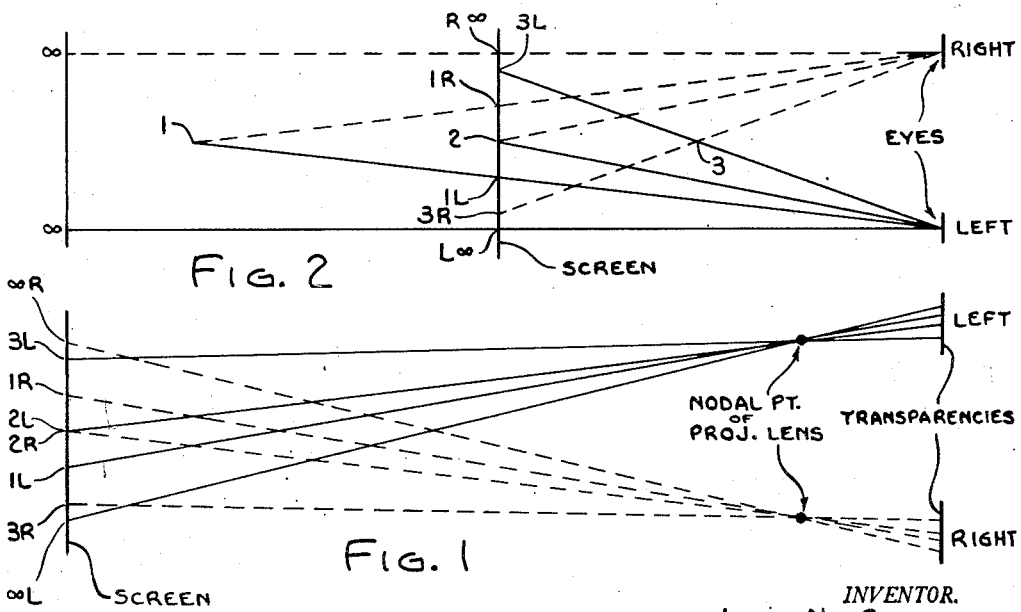
INVENTOR.
JOHN N. GRAEF
BY
John W. Michael
ATTORNEY Dec. 28, 1954   J. N. GRAEF   2,697,890
METHOD OF AND APPARATUS FOR MOUNTING STEREO SLIDES
Filed Nov. 19, 1952   2 Sheets-Sheet 2

INVENTOR.
JOHN N. GRAEF
BY John W. Michael
ATTORNEY

United States Patent Office 2,697,890
Patented Dec. 28, 1954

2,697,890

METHOD OF AND APPARATUS FOR MOUNTING STEREO SLIDES

John N. Graef, Polk, Wis., assignor to David White Company, Milwaukee, Wis., a corporation of Wisconsin Application November 19, 1952, Serial No. 321,322

11 Claims. (Cl. 40—158)

This invention relates to a method of and apparatus for mounting stereo slides. The practice of this method and the use of the instant apparatus in mounting stereo slides produces results which are far superior to the prior methods of mounting stereo slides. The advantages attendant upon this method and apparatus are appreciated most markedly in conjunction with projection of stereo slides but are present and appreciable even in viewing with a hand viewer.

The principal object of this invention is to provide a novel method of and apparatus for mounting stereo slides so as to eliminate the need for adjusting a stereo projector when changing from close to far slide subjects and vice versa.

A further object of this invention is to provide the novel method of and apparatus for mounting stereo slides which eliminate the physical discomfort attendant upon viewing stereo projection when the slides are mounted according to any previously known method of mounting.

Other objects and advantages will be pointed out in, or be apparent from, the specification and claims, as will obvious modifications of the single embodiment shown in the drawings, in which:

Fig. 1 is a graphic representation of polar stereo projection;

Fig. 2 schematically represents the manner in which polar projection is viewed through polaroid glasses;

Fig. 3 is a graphic illustration of the manner of determining the distance of the camera window and the proper mounting of slides in which the nearest subject is at or behind the plane of the camera window.

Fig. 4 is similar to Fig. 3 but graphically illustrates the manner in which slides may be mounted to change the apparent distance between the taking camera and the near subject;

Figure 6:
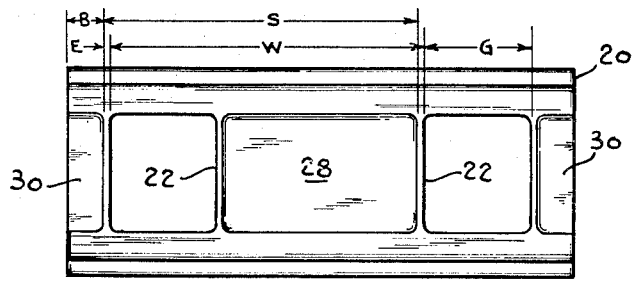
Fig. 6 is a back view of the mask.
Figure 5:
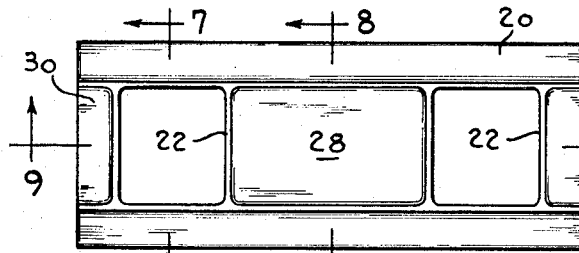
Fig. 5 is a front view of a slide mask embodying this invention.
Figures 7, 8:
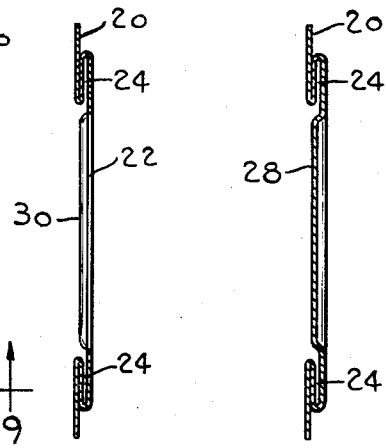
Figure 9:
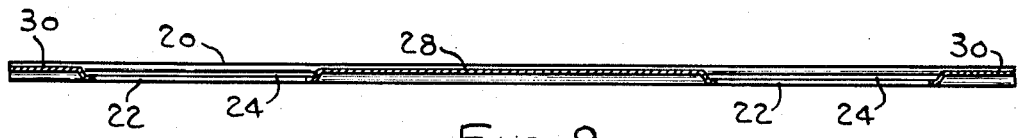
Figure 11:
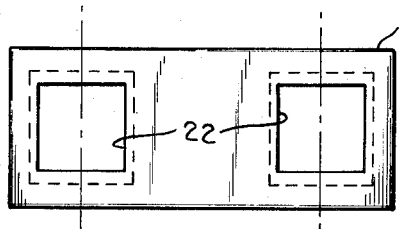
Figure 10:
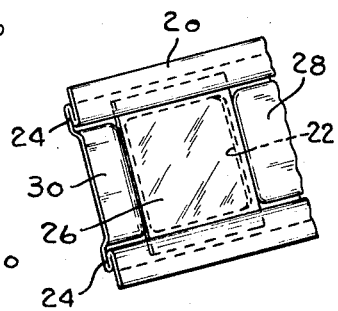
Figure 12:
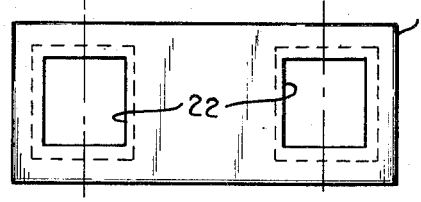
Figure 13:
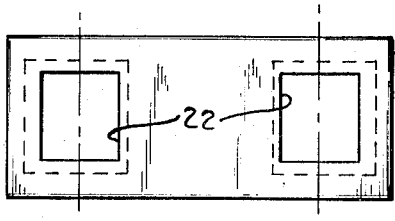

Figs. 7, 8, and 9 are sections of Fig. 5 taken as indicated by lines 7—7, 8—8 and 9—9, respectively;

Fig. 10 is a fragmentary perspective of one end of the mask showing the manner in which a transparency is registered with the aperture; and Figs. 11, 12, and 13 show a series of masks embodying the present invention and designed to accommodate transparencies having subjects located at normal, middle, and close up distances, respectively.

In order to fully understand this invention it is expedient to start off with an analysis of the method of polar projection with stereo slides and the manner in which stereo slides are viewed in order to obtain the sensation of depth. Referring first to Fig. 1, a very simple diagrammatic showing of a projection arrangement is set out to indicate the projection of four points. One point is located at infinity with respect to the camera when the picture was taken and the other three points are located at various closer distances with respect to the taking camera. It will be noted that the two transparencies are transposed—that is, the right transparency is on the left and the left is on the right. The transparencies also are inverted. When the slide is projected the image is transposed and inverted so that the image from either side is placed in upright position. It will be noted that the image in the left transparency at an infinite distance from the camera when the picture was taken crosses the corresponding image on the right transparency. Thus, following from the nodal points of the two projector lenses the lines cross and terminate at the screen in the positions denoted "Infinity Left" and "Infinity Right." Ideally these points should be separated by approximately two and one-half inches which represents the average interpupilary distance of the American people. It will also be noted that the images of point 1 have also been transposed so that 1R is on the right of the center line. The images of point 2 are superimposed at the screen while the images of point 3 have not been transposed. Thus point 3R is at the left and 3L is at the right.

Now, referring to Fig. 2, the manner in which the images projected in Fig. 1 are viewed may be seen in the diagrammatic layout. When it is remembered that the images are projected through polarized filters and are therefore polarized on the screen (which is a metallic surface which does not disturb the polarization), it will be appreciated that the eyes of the viewer can translate the various images on the screen only if wearing properly corrected polarized glasses. Thus the left eye sees the screen through a filter which limits the vision of the left eye to left images. Similarly the right eye can see only right hand images.

The left eye looks straight ahead to see the left infinity point and the right eye looks straight ahead to see the right infinity point since the distance between the left and right infinity points is the same as the distance between the pupils of the eyes. Therefore, when looking at this point on the screen the viewer has the sensation of looking at a point located at a great distance away from him. This is so since his eyes are collimated or looking out in parallel lines and our senses are so developed that this creates the sensation of looking at a distance point even though the focal point is at the screen. It will be noted that the eyes must focus on the image on the screen at all times while the degree of conversion may vary. Thus looking at point 1 the left eye looks at point 1L on the screen and the right eye looks at point 1R. In order to do this the eyes must converge and if the lines of conversion are extended they will meet behind the screen at point 1 as shown in Fig. 2. This represents the apparatus location beyond the screen at which the image point 1 is located. It will now be a simple matter to determine the apparent distance of point 2 since reference of Fig. 2 demonstrates that the eyes converge at the superimposed images 2L, 2R and therefore the point 2 is located at the screen. In order to view point 3 it will be apparent that the right eye must converge until it can see the point 3R which is on the left of the screen while the left eye must see point 3L which is on the right of the screen. The intersection of the two lines R, 3R and L, 3L is at the point 3 which lies between the viewer and the screen. Therefore the apparent location of point 3 is ahead of the screen.

From the above description it should be clear that in order to view stereo slides it is necessary for the person viewing the slide to separate the functions of convergence and of focus. Thus when viewing a screen the focus must be maintained on the image on the screen while the convergence varies from points spatially in front of the screen and in back of the screen.

In spite of the fact that it has been a lifelong habit to converge and focus on the same point the separation of focus and convergence is readily accomplished and accepted by the eyes so long as it is kept within a reasonable range. This range varies, of course, for different individuals and in order to determine the universally acceptable range it is necessary to first attempt to determine experimentally the limits of this range. I have found that the eyes will accommodate the convergence on objects at or behind the screen with no difficulty whatsoever and will, in fact, accommodate convergence upon points spatially located in front of the screen within certain limits. If the spatial location of the point in front of the screen becomes too close to the viewer considerable eye strain is occasioned while maintaining the focus on the screen and attempting convergence at close range. Therefore if point 3 in Fig. 2 is too close to the viewer discomfort will be experienced and the only way of overcoming this discomfort is to move point 3 away from the viewer.

Now, referring back to Fig. 1, it will be apparent that two ways of moving point 3 from the viewer might be employed. The reason that point 3 appears to be located between the viewer and the screen is that images 3R and 3L have not been transposed in projection of the image. If the images 3R and 3L can be brought closer together the degree of convergence will decrease and the apparent distance between the viewer and point 3 will increase. Indeed, if 3R and 3L are superimposed as the case of 2L and 2R in Fig. 2 the point 3 will appear to be located at the screen and if the point can be transposed in projection point 3 can be made to appear behind the screen. It will be appreciated that if the lenses are adjusted to bring the nodal points closer together the points 3R and 3L will move towards each other and may even be superimposed if the nodal points are brought together to a sufficient extent. This adjustment of the lenses is the usual method of moving the image 3 rearwardly in space in order to relieve the discomfort experienced when the image point 3 lies too close to the viewer. Reference to Fig. 1 will also indicate that if the lenses are left as shown and the transparencies are moved apart to increase the separation between homologous points on the transparencies the images 3R and 3L will approach each other and will occasion the image point 3 moving rearwardly in space with respect to the viewer. Thus relief from the discomfort occasioned by the apparent image 3 lying too close to the viewer can be obtained by adjusting the lenses or increasing the separation between the transparencies.

It will be readily apparent that if images 3R and 3L are brought closer together the separation between points 1L and 1R or infinity L and infintiy R will be increased. For example, points 1L and 1R in Fig. 2 may end up in a position where they are located where infinity L and infinity R are located in Fig. 2. That would put the infinity point at a separation greater than two and one-half inches or in other words the eyes would have to diverge in order to see the infinity point. While our eyes are relatively flexible and adaptable, divergence is one action which can be accomplished by very few people and when it is attempted by those who cannot accomplish it serious physical discomfort is experienced. Therefore we can derive the conclusion that when adjustment is necessary with respect to the near point (point 3) the separation of the far point in the adjusted image should not exceed a separation of two and one-half inches which would place the far point at infinity. If the far point separation in the adjusted image exceeds two and one-half inches the slide will be uncomfortable to view even though the near point now is comfortable. Therefore it can be said that there is a limited range of subject matter for any slide if the near point is uncomfortably close. If the subjects matter in the slide are kept within proper limits the near point of the slide may be adjusted to move it away from the viewer without increasing the separation of the far point beyond two and one-half inches.

From the above we have learned that it is ncessary to adjust certain slides in order that they might be viewed with comfort. The customary practice is to adjust the lenses of the projector for the various slides. This method is completely unsatisfactory insofar as the comfort of the person viewing the projected slide is concerned. The reason for this is that the eyes tend to follow the projected images while adjustment is being made and are subjected to even more severe eye strain as the result of the adjustment process. Furthermore, if the projector has been adjusted for a near object and a slide showing a far object is then put on the screen the eye is subjected to a divergence which gives rise to serious discomfort. The result of these operations not infrequently results in the people viewing the slides becoming nauseated and only very careful planning of a slide showing can avoid this result. The recommended procedure is to group slides according to distance and to adjust the projector for each grouping without the people in the audience looking at the screen during the adjustment process. Of course, it is easily appreciated that the grouping in all likelihood does not fall into the sequence arrangement which would otherwise be desirable in showing the slides.

In the past highly skilled technicians in the stereo field have undertaken to vary the lateral separation of the slides in order to effect the adjustment at the slide rather than by adjusting the lenses of the projector. The methods employed in the past have all been subject to one serious objection in that the so-called apparent window inherent in any stereo slide would have its location varied in space according to the adjustment imparted to the slide. Thus every stereo camera inherently creates a window effect when it takes a picture. Further details as to how this window is created will be given hereafter. Under ideal viewing conditions this window should remain at a constant spatial location. Merely varying the separation between the transparencies by cutting the mount in two and increasing the separation as advocated by the skilled technicians results in this window assuming a different spatial location for each slide projected. This becomes very distressing and results in discomfort. Furthermore, this window is desirably located in front of the image since we are accustomed to looking through a window to see an object and not accustomed to seeing the object coming through the window or located ahead of the window. However, the prior art method of effecting separation of the transparencies makes no allowance for the window location and in addition to having the window moved forwardly and rearwardly in space resulted in near objects being located ahead of the window or coming through the window.

The adjustment of the projector lenses is also subject to the same difficulty with respect to the window—that is, the slide as projected and not adjusted may have the object located spatially ahead of the window and adjusting the lenses does not affect the location of objects with respect to the window but merely tends to move the window and the objects back towards the screen. Thus it will be apparent that both prior art systems for compensating for the location of the image does not compensate so as to avoid all discomforting effects of stereo slide projection. Of the two it will be apparent that the compensation of the slide mount rather than of the lenses yield better results since the adjustment period is avoided. However, the practice of the system compensating the slide mount has been so complicated and technical that very few people have mastered it. In order for stereo photography to gain wide acceptance it must be simple and I propose to provide a method simplifying the mounting of stereo slides so as to avoid the need for adjustment of the projector during a slide showing and to further avoid the other factors which give rise to physical discomfort, such as the location of the window with respect to the image. I propose to effect this method by varying the lateral separation of the transparencies while maintaining a constant spacing of the apertures in the slide mount. The result is a constant location of the window in space with the near object falling at or behind the window. I propose to provide a series of slide mounts which bear a predetermined relationship with respect to each other so as to provide a proper slide mount for any transparency. Thus the person mounting the slide need only select the proper mount in accordance with the subject matter of the slide and proceed with the mounting which is a simple operation.

From the above it will be apparent that my objective is to provide a slide mount for various classes of slides in which the near point will be no closer to the viewer than the apparent window and in which the spatial location of the apparent window remains substantially constant. It will be appreciated that this can be accomplished only if the distance from the near to the far object does not exceed the corrective limitations inherent in any correction system as explained fully above with respect to Figs. 1 and 2. However, even those slides in which this range is exceeded can be mounted in such a way as to take best advantage of the subject matter of paramount interest.

The above remarks are applicable to projection of slides. When slides are viewed with a hand viewer the discomfort described above does not become apparent or at least is not aggravated as is the case with projected slides. Viewing the slides and viewing projected images involve precisely the same considerations except that in projection the eyes focus on the screen while in viewing slides with a hand viewer the eyes are focused at infinity. The fact that the eyes are focused at infinity when viewing slides in a hand viewer is thought to account for the lack of discomfort when viewing a given slide even though the same slide when projected would give rise to serious discomfort. The reason for this is that the eyes, when focused at infinity, are relaxed insofar as the focus function is concerned. Now, when viewing a slide through a viewer with the eyes focused at infinity, one function of the eye is completely relaxed and apparently the eyes can accommodate a much greater variation from the normal function of simultaneous focus and convergence when one factor (focus) is completely relaxed. Except for the fact that the discomfort is not apparent in viewing slides with a hand viewer the optical considerations are precisely the same and for the sake of simplicity the following descriptions are based on a viewer. It should be remembered, however, that precisely the same formulae are applicable with respect to a projector and therefore the calculations are good for a projector which is the prime purpose of this invention.

The fact that each of the stereo pairs when exposed in the camera is exposed through an aperture, which is necessary in a camera, automatically creates an apparent window. The distance of this apparent window in front of the camera is inherent in a given camera. This window is located at a distance at which the area masked by each aperture is precisely the same area as masked by the other. Put another way, the apparent window is located in a plane in which all objects will be located on the stereo pairs at precisely the same position. Since I desire to provide a series of masks wherein the nearest object is no closer to the viewer than the window it will be apparent that one mask must be provided to accommodate all objects from the window distance to infinity and this mask is taken as the basic mask. For example, if the camera used to make the stereo pair has an apparent window distance of seven feet the basic mask will accommodate all objects from seven feet to infinity. The manner in which the dimensions of this mask are determined is shown in Fig. 3. Thus we have a point located a distance D ahead of the camera lenses and wish to photograph the point on film located on the film plane at distance L behind the nodal point of the camera lens. The point at D must be the center point or lie on the center line of the film since the point at D lies in the center of the plane of the apparent window. Therefore, drawing a line from the point through the nodal point of each lens back to the film plane will give the location of the center lines of the transparencies. Having determined the center line we can now mask off the desired area of film. This is dictated by space limitations within the camera and in the case of 35 mm. film by the perforations of the film which will give the best use of the film in the camera. The distance of the apparent window can be determined for an existing camera by projecting a line through the center point of the film and the nodal point of the lens and finding where it intersects a line bisecting the line connecting the nodal points of the two lenses of the camera. It will be appreciated that this method merely reverses the one outlined immediately above.

Now in order to determine the proper placement of the center line point in a slide mount we first assume a viewer having lenses with the same focal length as the camera lenses and draw a parallel line ahead of the lens line as shown on Fig. 3 labeled "slide." We now consider with respect to the slide that the optical separation V of the viewer lenses is equal to the optical separation C of the camera lenses. The showings in Fig. 3 combine the optics of the camera and the viewer but it will be appreciated that this merely results in the simplification of the showing and it should be understood that the optics of a viewer incorporate precisely the same problems as found in a projector. Therefore the calculations with respect to a viewer are proper with respect to a projector. Showing the problem as in Fig. 3 also graphically takes into account the transposition and inversion of the transparencies in the mounting process. Now by drawing a line along the optical axis of each lens (this line also represents a line of sight to a point at infinity) we can determine the amount by which the center line point on the film plane deviates from the infinity point by simple geometry. Thus the relationship of two similar triangles can be expressed as follows:

$$\frac{Z}{\frac{C}{2}} = \frac{L}{D}$$

Solving for Z we have $$Z = \frac{\frac{CL}{2}}{D}$$

Considering the viewer lenses as having an optical separation $V=C$ we realize that when mounted the infinity point which lies on the optical axis of the camera lens must be aligned with the optical axis of the viewer lens in order to obtain the sensation of a point at infinite distance when viewing the slide. The center point must be located inwardly so that the line of sight to the apparent point at the window will converge. The amount by which the center point must be moved in is represented by the line Z'. Z' is equal to Z since the optical separation and the focal length of the viewer and the camera are the same. The distance between the centers of the two transparencies is equal to $$V - \frac{CL}{D}$$

This value is equal to W which is the separation of homologous sides of the slide windows or apertures. In the case of the present slide in which we assume that the near point is the distance D in front of the camera and all other points lie behind point D, then it will be apparent that we want the transparencies or films to be coincident with the apertures in the slide. Therefore the center point of the film must coincide with the center point of the window. Thus the separations of homologous sides of the film will equal W for this mask. We now have a mask wherein the separation of the homologous sides of slide apertures and the separation of the homologous sides of the film equal $$V - \frac{CL}{D}$$

It should be noted here that in all likelihood V will not equal C; that is, the optical separation of the viewer will not be equal to the optical separation of the camera. Experience has dictated that the best optical separation of a camera is in the neighborhood of seventy millimeters while the best optical separation of a viewer is in the neighborhood of sixty-five millimeters. Therefore Fig. 3 does not exactly represent the situation as it will exist in real practice. However, the difference between V and C is small and it has been found that various values may vary by as much as twenty to thirty per cent without adversely affecting the quality of the image. Fig. 3 actually presents a situation which is true orthostereo. Similarly the focal length of the viewer lens is generally a little longer than the focal length of the camera lens but this value has no effect on the formulae just determined.

We turn now to the situation in which the image in photograph lies ahead of the camera window and must be corrected to lie back of the camera window. This situation is illustrated in Fig. 4 and again is based on the assumption of a viewer having the same optical separation and focal length as the camera. In Fig. 4 the point A' lies at the camera window while the point A is the actual location of the object photographed. This will photograph on the film at the point indicated by the line passing from A through the nodal point of the lens to where it intersects the film plane. This point lies the distance Y from the optical axis of the lens. Again solving for similar triangles we find $$\frac{L}{N} = \frac{Y}{\frac{C}{2}}$$

Thus $$Y = \frac{\frac{CL}{2}}{N}$$

Knowing that the window is located at A' it is apparent that the transparency must be moved outwardly until image $a$ lies at $a'$. We can determine the total separation by the formula $$S = W + 2\left(\frac{\frac{CL}{2}}{N} - \frac{\frac{CL}{2}}{D}\right)$$

Therefore $$S = W + \frac{CL}{N} - \frac{CL}{D}$$

or $$S = V - \frac{2CL}{D} + \frac{CL}{N}$$

From the above it will be apparent that one slide mount in which S equals W would serve for all slides wherein the near subject is at or behind the window distance. While the formula for W the separation of homologous sides of the slide window contains the variable $$L = \frac{Mf}{M-f}$$

(where M equals the mean object distance from the camera and $f$ equals the focal length of the camera lenses), the varation in the value of L is so small as to be negligible unless the object being photographed is at extremely close range. Therefore, for all practical purposes, we may use a constant value for W. Since the separation of homologous sides of the slide window is to be constant in a series of slide mounts it will be appreciated that the center line of the window remains constant. We now have only to find the separation of homologous sides of the transparencies for various near distances N. We may select various near distances in order to cover the range of distances between 2½ feet, for example, and the window distance (given as 7 feet in the example above). Thus we may have one slide mount suitable for a range of distances from 33 in. to 6 ft., for example, and a second slide mount suitable for a range from 4 feet to 18 feet, for example.

The manner in which the greatest distance P which will be acceptable in the compensated slide may be determined will be apparent from Fig. 4. Thus an object located at distance P in front of the camera would be located at $x$ on the uncompensated slide mount and would be shifted to $x'$ on the optical axis in the compensated mount. Since the movement from $x$ to $x'$ is the same as the movement from $a$ to $a'$ we may set up the following relationship:

$$\frac{P-L}{\frac{C}{2} - \left(\frac{S-W}{2}\right)} = \frac{P}{\frac{C}{2}}$$

Solving for P we have $$P = \frac{LC}{S-W}$$

This formula is of no importance when determining the slide mount except to check and determine whether the far point for the particular mount overlaps the near point for the next mount in the series. It is advisable to have the various acceptable distance ranges overlap throughout the series so as to make the series versatile. The far point can be determined after the particular mount has been decided upon and this information may be supplied to the photographer so that we may properly arrange the subject matter of the photograph to fall within the ranges and in this way be sure of proper projection characteristics without requiring divergence on the part of the viewers. A slide mask incorporating the present invention is shown in Figs. 5 through 10 of the drawings. A mask 20 is provided with apertures 22 and has its longitudinal edges folded back upon themselves so as to form slots 24 receiving the ends of the transparencies 26. The transparencies 26 are registered with the apertures 22 by virtue of the cooperation with the side walls of the channels formed by the raised center portion 28 and the raised end portions 30. This may be seen clearly in Fig. 10. Since the transparencies are cut from the film strip to a specified width they fall into the confines of channels snugly so as to positively position the transparencies with the desired separation between homologous sides.

The mounts may be fabricated of aluminum foil which has sufficient flexibility to permit the ends of the transparencies to be easily inserted in the longitudinal slots 24. The mask and transparencies are then placed between glass and the edges of the glass are bound to complete the slide.

Figs. 11, 12, and 13 shows a series of slide mounts in which the separation W between homologous sides of the apertures is maintained constant and the separation S between homologous sides of the film is varied in accordance with the principles outlined above. Thus it will be noted that the center lines of the apertures in the series remain constant and the width of the apertures decreases as the mount is designed to accommodate closer subjects matter. The separation S between homologous sides of the transparencies increases as the mount is designed to accommodate closer subjects matter. The dimensional variations are somewhat exaggerated in the drawings in order to accentuate the distinctions between the mounts of the series. A series of mounts embodying this invention may have the dimensions set forth in the following chart and will accommodate transparencies in which the subjects matter have the near and far range set forth in the chart:

| Fig. | Range | B | S | E | G | W |
|---|---|---|---|---|---|---|
| 11 | 7′ to ∞ | .291 | 2.450 | .046 | .844 | 2.450 |
| 12 | 4′ to 18′ | .276 | 2.480 | .076 | .814 | 2.450 |
| 13 | 33″ to 6′ | .254 | 2.525 | .122 | .768 | 2.450 |

The user need only estimate the camera distance to the near subject in a particular picture and select the corresponding mount which is, of course, properly indexed to facilitate the selection. Pictures so mounted may be projected without readjusting the projector during the showing.

While the apparatus has been described as a mask it will be appreciated that various other mask forms may be used without departing from the spirit of this invention. Similarly, slide mounts in which provision is made for accurate location of the transparencies may also be used. The principal feature of this invention is the variation of the separation of the transparencies while maintaining a constant spacing between homologous sides of the apertures in the slide. This places the apparent window at the same spatial distance for all slides while permitting adjustment of the apparent spatial distance to the near subject to keep the near subject at or behind the apparent window. In this way complete comfort in viewing is achieved.

Although but one embodiment of the present invention has been illustrated and described, it will be apparent to those skilled in the art that various changes and modifications may be made therein without departing from the spirit of the invention or from the scope of the appended claims.

I claim:

1. The method of mounting stereo slides comprising, maintaining a substantially constant spacing between homologous sides of the two window apertures in the slide mount while varying the separation between the homologous sides of the transparencies to place the near subject of the transparency at or behind the apparent window when the transparencies are projected.

2. The method of mounting stereo slides comprising, maintaining substantially uniform spacing of homologous sides of the apertures in the slide to maintain the apparent window at substantially a constant spatial position when the transparencies are projected while varying the separation of homologous sides of the transparencies in order to place the near subject of the transparency at or behind the apparent window when the slide is projected.

3. The method of mounting stereo slides comprising, maintaining the separation of homologous sides of the apertures in the slide substantially at a value of W which equals $$V - \frac{CL}{D}$$

while varying the separation S of homologous sides of film substantially in accordance with the formula $$S = W + \frac{CL}{N} - \frac{CL}{D}$$

where V equals the optical separation of the viewer or projector, C equals the optical separation of the camera, L equals the image distance from the camera lens, D equals the distance of the apparent window of the camera, and N equals the distance of the nearest object in the picture from the camera.

4. A series of slide mounts characterized by a constant distance between the center lines of the apertures in the mounts and a varying distance between homologous sides of the films.

5. A series of stereo slide mounts each provided with means for cooperating with the sides of the films to be mounted in the mounts for registering the films with the apertures in the mount, the slide mounts of the series being characterized by a constant spacing of homologous sides of the apertures in each slide and different separation of said registration means so as to vary the separation between homologous sides of the film through the series.

6. A series of stereo slide mounts in which the center lines of the apertures of each mount are spaced substantially the same distance as the center lines of the apertures of the other mounts of the series, each mount in the series being provided with means for registering films with the apertures and for spacing the films a predetermined distance, the registration means providing an increasing separation for each mount in the series so that each successive mount will accommodate a closer near subject in the films mounted therein and the slides of the series may be projected without regard to the nearness of the near subject in the particular slide and without adjustment of the projector for each slide.

7. A series of stereo slide mounts each of which has a pair of apertures and is provided with means for spacing transparencies in registration with said apertures, the separation of homologous sides of said apertures being substantially the value W for all the slides in the series, the spacing means of each slide in the series being operative to space the transparencies mounted in the slide substantially at a distance S which equals $$W + \frac{CL}{N} - \frac{CL}{D}$$

where C equals the optical separation of the taking camera, L equals the distance of the image behind the camera lens when the picture is taken, D equals the distance of the apparent window of the camera before the camera lenses, and N equals the distance before the camera of the near point for which the particular slide in the series is designed.

8. A series of stereo slide mounts each of which comprises a mask provided with a pair of apertures and having means for registering film transparencies with the apertures, the spacing of the center lines of said apertures remaining substantially constant throughout the series while the spacing between homologous sides of the film transparencies increases throughout the series for each mask designed to accommodate transparencies having the closest object nearer the camera position than in the preceding slide of the series.

9. A stereo slide mount for transparencies in which the near object is at a distance N from the taking camera and the distance N is less than the distance D which represents the distance from the taking camera to the apparent window of the camera, comprising a mount having a pair of apertures the homologous sides of which are separated by a distance $$W = V - \frac{CL}{D}$$

(where V equals the optical separation of the viewer or projector lenses, C equals the optical separation of the camera lenses, and L equals the image distance from the camera lens), and means on the mount for cooperating with the transparencies for separating homologous sides of the transparencies a distance $$S = W + \frac{CL}{N} - \frac{CL}{D}$$

10. A stereo slide mount for transparencies in which the near object is at a distance N from the taking camera and the distance N is less than the distance D which represents the distance from the taking camera to the apparent window of the camera, comprising a mount having a pair of apertures the homologous sides of which are separated by a distance W substantially equal to $$V - \frac{CL}{D}$$

(where V equals the optical separation of the viewer or projector lenses, C equals the optical separation of the camera lenses, and L equals the image distance from the camera lens), and means on the mount for cooperating with the transparencies for separating homologous sides of the transparencies a distance S substantially equal to $$W + \frac{CL}{N} - \frac{CL}{D}$$

11. A stereo slide mount for transparencies in which the near subject is closer to the camera than the apparent window of the camera, comprising, a pair of apertures in the mount, and means for registering the transparencies with the apertures, said means separating homologous sides of the transparencies by a distance which is greater than the separation of homologous sides of the apertures.

References Cited in the file of this patent

UNITED STATES PATENTS

| Number | Name | Date |
|---|---|---|
| 2,164,655 | Kleerup | July 4, 1939 |
| 2,287,624 | Langenfeld | June 23, 1942 |
| 2,292,312 | Wittel | Aug. 4, 1942 |
| 2,307,981 | Babcock | Jan. 12, 1943 |
| 2,522,662 | Brier | Sept. 19, 1950 |

FOREIGN PATENTS

| Number | Country | Date |
|---|---|---|
| 994,899 | France | Nov. 23, 1951 |

OTHER REFERENCES

Helmholtz: Treatise on Physiological Optics, vol. III, Edited by J. P. C. Southall, 1925, pp. 299, 312, 330–333 and 360. (English translation.)

Journal of the Optical Society of America, vol. 31, 1941, pp. 325–334.

American Photograph, article entitled "Framing the image in the stereoscope, part I," May 1948; pp. 276–279.

American Photography, article entitled "Framing the image in the stereoscope, part II," June 1948; pp. 350–354.